Figure 3:
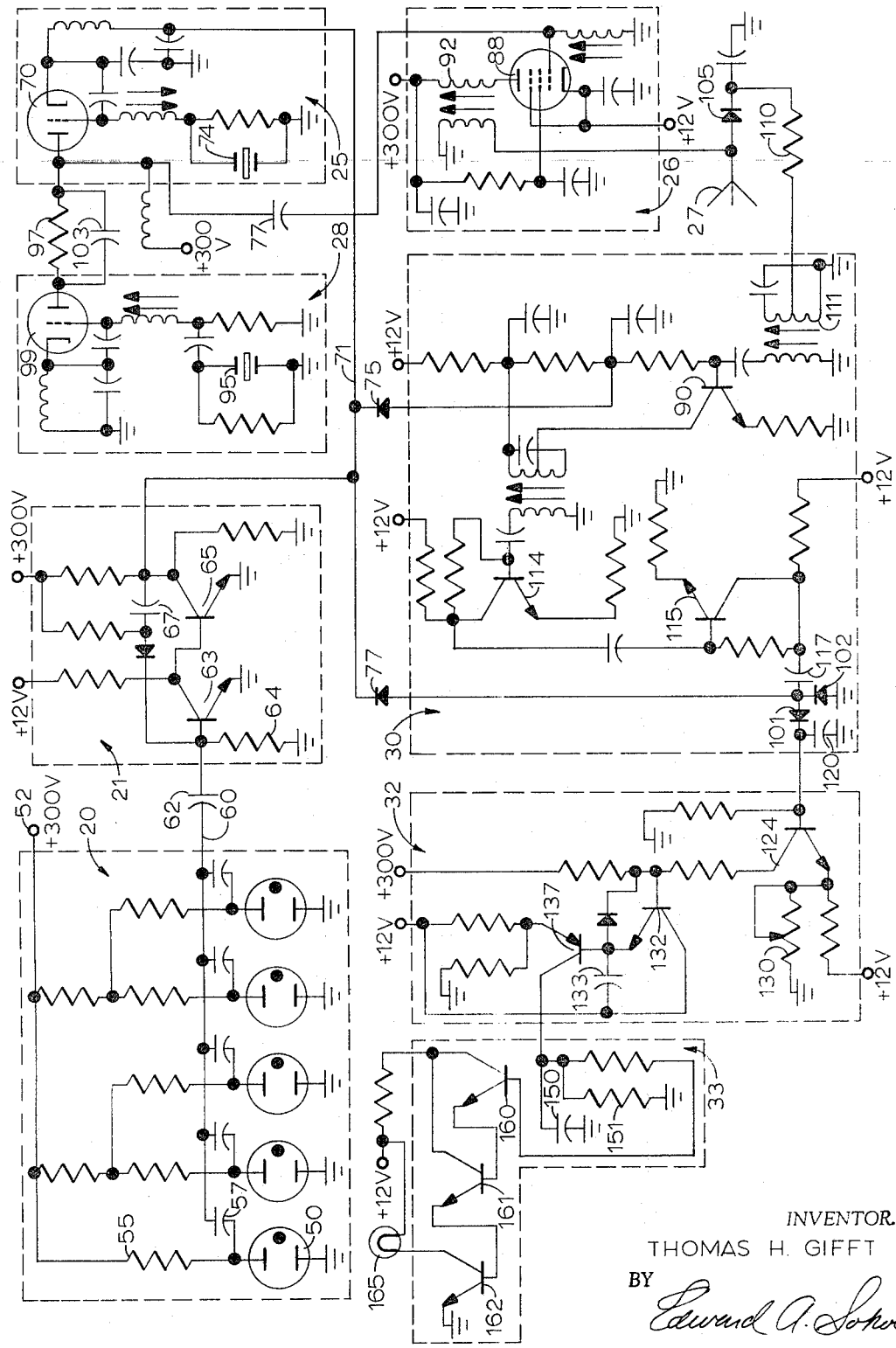

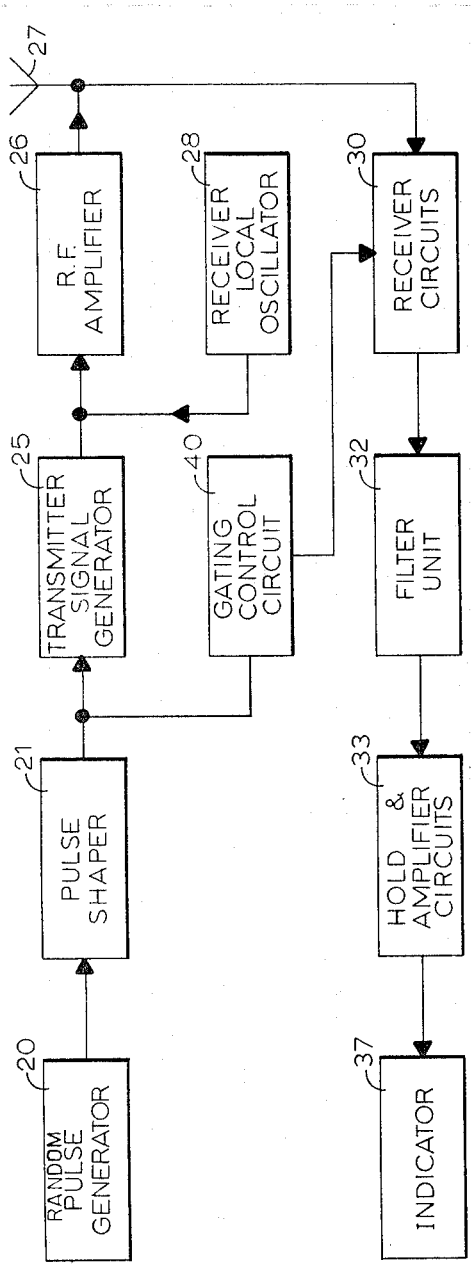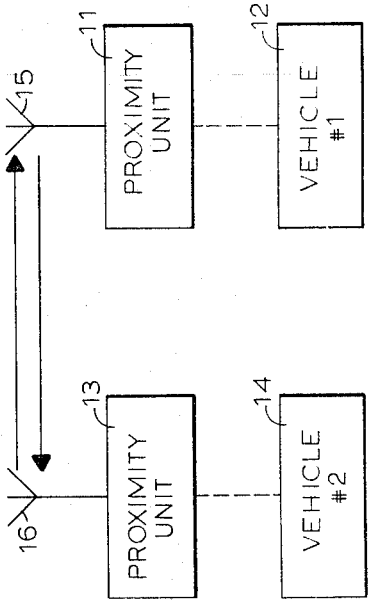

INVENTOR.
THOMAS H. GIFFT
BY Edward A. Sokolski
ATTORNEY

United States Patent Office 3,293,600
Patented Dec. 20, 1966

3,293,600
PROXIMITY INDICATING SYSTEM
Thomas H. Gifft, Redondo Beach, Calif.
(1141 Fountain Way, Anaheim, Calif. 92805)
Filed Mar. 23, 1964, Ser. No. 354,072
12 Claims. (Cl. 340—33)

This invention relates to a proximity indicating system and more particularly to such a system utilizing units on a plurality of vehicles for producing a signal on any of such vehicles which are within a predetermined range of any other of such vehicles.

Emergency vehicles such as ambulances, fire engines, police cars and the like normally are given the complete right of way when speeding to the scene of a disaster or accident and ordinary traffic yields this right of way. Oftentimes, however, several emergency vehicles may be travelling under emergency conditions with a complete right of way at the same time and may not be apprised of each other's presence until it is too late to avoid a collision. It is therefore highly desirable to provide a warning to the operators of such vehicles when other emergency vehicles are operating in the vicinity so that they will be apprised of the necessity to use extra caution in approaching intersections.

Warning systems for this purpose have been available in the prior art, but these either involve the installation of costly equipment along the streets and/or overly complicated and expensive equipment on the vehicles themselves. The necessity for having street installations limits the utility of the system in that it can only be used in areas where the necessary street installations have been completed. It is obvious too, that to complete the necessary street installations over a wide area makes the system expensive both to install and maintain. The overly complicated equipment involved in such prior art installations also tends to limit the reliability thereof.

The device of this invention overcomes the shortcomings of prior art proximity indicating systems by completely eliminating the necessity for any street installation, the units of the system being carried on the vehicles themselves. Such units are relatively simple to install and maintain and are of economical construction, yet are nevertheless capable of accurate and reliable operation over long periods of use. In view of the lack of necessity for any street equipment, such units are capable of operating in conjunction with each other in any area.

It is to be noted that while the proximity indicating system of the device of the invention is described in connection with utilization for emergency land vehicles, it can be used to equal advantage with other types of vehicles, such as, for example, ships and aircraft.

It is therefore an object of this invention to provide an improved system for indicating proximity between vehicles.

It is another object of this invention to provide a system for indicating proximity between vehicles in which the equipment necessary for the operation thereof is completely contained in such vehicles.

It is still a further object of this invention to provide a system for indicating proximity between vehicles of relative simplicity and economical fabrication.

It is still another object of this invention to provide a system for indicating proximity between vehicles of higher reliability than most prior art devices.

It is still a further object of this invention to lessen the hazard of collision between vehicles.

Other objects of this invention will become apparent from the following description taken in connection with the accompanying drawings of which, FIG. 1 is a block diagram illustrating the basic operation of the device of the invention, FIG. 2 is a block diagram illustrating a preferred embodiment of the device of the invention, and FIG. 3 is a schematic drawing illustrating the details of a preferred embodiment of the device of the invention.

The device of the invention operates by means of a proximity unit which is installed on each vehicle. Each of these proximity units includes means for transmitting uniform pulses of radio frequency energy at a predetermined radio frequency and at a random pulse rate. Means are provided in each unit for detecting signals at the predetermined frequency of the transmitted signals. An antenna is further provided for radiating the transmitter signals and for receiving signals for the detection means. Means are still further provided for disabling the detection means when the transmitter is operating, to avoid there being an output from the detection means in response to the transmitter carried in the same vehicle. The output of the detection means is appropriately amplified and used to drive an indicator such that the indicator is actuated whenever signals of a predetermined minimum amplitude are received by the detection means from the transmitter of another vehicle.

Thus, whenever two vehicles carrying the proximity units of the device of the invention come within a radio signal range of each other, an appropriate signal is produced on each of their indicators.

Referring now to FIG. 1, the basic operation of the system of the invention is shown. A first proximity unit 11 is carried on a first vehicle 12 and a second similar proximity unit 13 is carried on a second vehicle 14. Proximity unit 11 transmits pulse signals which are radiated by antenna 15 and are received by the detector of proximity unit 13 from antenna 16. Similarly signals transmitted by proximity unit 13 are received by proximity unit 11. As to be explained in connection with FIGS. 2–4, the transmitter of the proximity units are caused to transmit pulses of energy in a random fashion so that there is little likelihood that both transmitters will transmit simultaneously to any great degree over any given period of time. Further, the transmission duty cycle is kept relatively low so that there will be a substantial receiving period for each proximity unit so as to enable each of the detectors ample opportunity to receive transmitted signals. The proximity units 11 and 13 are adjusted so that their respective indicators will be actuated in response to the transmitted signals of the other vehicles when the vehicles come within a radio signal range of each other.

Referring now to FIG. 2, a block diagram of a preferred embodiment of the device of the invention is shown. Pulse generator 20 generates pulses randomly at a relatively low frequency. In an operative embodiment of the device of the invention, an average pulse rate of 10 cycles per second was found to provide satisfactory operation. This frequency however, can be made higher or lower than this as application requirements may dictate. These pulses are fed to pulse shaper 21 where they are converted to relatively long pulses of a uniform width and amplitude compared to normal radar practice and in accordance with the random output pulse repetition rate of pulse generator 20. Pulses of the order of 5 milliseconds have been found to provide satisfactory operation. The output pulses of pulse shaper 21 are used to key transmitter signal generator 25. The output of transmitter signal generator 25 which is at an appropriate radio frequency is amplified by RF amplifier 26 and thence radiated by means of antenna 27.

Receiver local oscillator 28 continually emits relatively low amplitude radio frequency signals at a frequency either higher or lower by the intermediate frequency of receiver circuits 30 than the transmission frequency of transmitter signal generator 25. The output of receiver local oscillator 28 is amplified by RF amplifier 26 and fed to the mixer unit (not shown) of receiver circuits 30. With the reception of signals by antenna 27 at the transmitter frequency, intermediate frequency signals are generated in receiver circuits 30 by virtue of the mixing action of the output of receiver local oscillator 28 therewith. These intermediate frequency signals are appropriately detected in receiver circuits 30 and the detected envelope fed to filter unit 32. Filter unit 32 operates to eliminate noise signals and transmitter signals of below a predetermined amplitude. The output of filter unit 32 is fed to hold any amplifier circuits 33 where appropriate amplification is achieved and where a continuous output signal is generated in response to the pulse input signals received by receiver circuits 30. This continuous output signal is used to actuate indicator 37 which may, for example, comprise an indicator lamp.

To avoid the actuation of receiver circuits 30 by the signal generated by transmitter signal generator 25, a gating control signal is applied from pulse shaper 21 by means of gating control circuit 40. This gating control signal effectively disables receiver circuits 30 when transmitter signal generator 25 is caused to emit in response to pulse shaper 21.

Let us now refer to FIG. 3 which illustrates the preferred embodiment of the device of the invention in schematic form. Pulse generator 20 is a novel circuit for generating random pulses and includes a plurality of gas discharge tubes 50 which may be of the neon variety which are connected to form a random repetition rate pulse generator. Power is connected from terminal 52 through a resistor 55 to the anode of each of neon bulbs 50. Capacitors 57 are connected from the anode of each of neon bulbs 50 to output line 60. Each neon bulb 50 with its associated capacitor 57 and resistor 55 forms a pulse generating circuit which fires in a random fashion when the charge on the associated capacitor reaches the firing voltage of the bulb. This depends, not only on the resistive-capacitive time constant of the capacitor's charging circuit but also on the previous charging history of the capacitor which may have resulted in a residual charge being left thereon. The values of resistors 55 and/or capacitors 57 are chosen so as to make for a different resistive-capacitive time constant for each pulse generating circuit.

The random pulse generator circuit operates as follows: When power is first applied to the circuit through terminal 52, the first of neon bulbs 50 to have a proper ignition voltage applied to its anode will ignite. Which one of the bulbs will be so ignited depends not only on circuit parameters but also on conditions at the time the power is applied. When one of the bulbs is ignited, the voltage on line 60 is dropped so as to prevent the ignition of any other bulb at that moment. With the ignition of one of the bulbs, however a charging path for the capacitors 57 of all of the other bulbs is provided through the ignited bulb and its associated capacitor. Depending on the time constants of the charging circuits, one of the capacitors will be the first to charge to a high enough voltage to fire its associated neon bulb. With the firing of this second neon bulb, a negative going pulse is produced on line 60 which acts to extinguish the previously conducting bulb. This second bulb will continue to conduct until the capacitor of another of the bulbs charges to the firing voltage at which time the second bulb is extinguished in the same fashion as the first bulb, as a third bulb fires. The bulbs, thus continue to successively fire and be extinguished with only one bulb conducting at a time.

The output pulses thus produced are completely random both in duration and time of occurrence. Other types of switching devices may be used in the pulse generator in place of neon bulbs 50, such as, for example, 4 layer switching diodes.

The output of random pulse generator 20 which is a series of negative going random pulses is fed through capacitor 62 to the base of transistor 63 in pulse shaper 21. Pulse shaper 21 comprises a conventional single shot multivibrator with transistor 65 normally cut off and transistor 63 normally conducting. When transistor 65 is in its normally cutoff state, a positive voltage is fed to the cathode of oscillator tube 70 in transmitter signal generator 25 to hold this tube at cutoff. With the arrival of the negative going random pulses from random pulse generator 20, transistor 63 is driven to cutoff and transistor 65 caused to conduct. The one shot multivibrator remains in this state for a period of time determined by the capacitance of capacitor 67 and the resistance associated with its charging circuit. Thus, transistor 65 remains in conduction for a predetermined period of time to result in negative going output pulses on line 71 having uniform width and amplitude and in accordance with the arrival of the random pulses on line 60. The pulses on line 71 are fed to the cathode of oscillator tube 70 causing this tube to generate radio frequency output signals in accordance with the keying pulses. Keying pulses from multivibrator 21 are also fed through diode 75 to negatively bias and thus disable IF amplifier stage 90 and through diode 77 to effectively disable detector diodes 101 and 102. The negative going pulse signals fed on line 71 through diode 75 and 77 thus act as a gating control to gate off the receiver when transmitter signal generator 25 is operating.

Transmitter signal generator 25 is a conventional crystal controlled overtone oscillator multiplier circuit, the frequency of oscillation of which is determined by piezoelectric crystal 74. The output frequency of the oscillator is a multiple of the frequency to which the grid is tuned which in turn is a multiple of the fundamental crystal frequency. As already noted, when the negative going output pulse from pulse shaper 21 appears on line 71, oscillator tube 70 which up to this time has been biased to cutoff by the positive voltage on line 71, is caused to conduct producing radio frequency output signals at the plate of the tube. In an operative model of the device of the invention, the keying signals on line 71 have a duration of approximately 5 milliseconds, thus causing transmitter signal generator 25 to emit radio frequency signals in bursts of this time duration. These radio frequency output signals are coupled through capacitor 77 to the grid of tube 88 of radio frequency amplifier 26. The radio frequency signals fed to RF amplifier 26 are appropriately amplified therein and radio frequency power is coupled from plate coil 92 to antenna 27.

Receiver local oscillator 28 is a crystal controlled oscillator similar in configuration to transmitter signal generator 25. The output frequency of oscillator 28 is determined by crystal 95 and is generally either higher or lower than the transmitter frequency by the predetermined intermediate frequency. The supply voltage fed to the plate of receiver local oscillator tube 99, is lowered by means of resistor 97 so that the radio frequency output signals of the local oscillator are considerably lower than those of the transmitter signal generator. The radio frequency output signals of receiver local oscillator 28 are coupled through capacitor 103 and capacitor 77 to RF amplifier 26 and are thence coupled through the RF amplifier to mixer diode 105 which is also connected to antenna 27. Thus, as can be seen radio frequency amplifier 26 is utilized both to amplify the output of transmitter signal generator 25 to a suitable level and to pass the local oscillator signal to mixer 105, in this manner providing a dual function for the components and minimizing the amount of circuitry required and thereby the cost thereof. The biasing on radio frequency amplifier tube 88 is preferably set so that the output of transmitter signal generator 25 drives this stage hard for full output while the output of receiver local oscillator 28 produces very little current flow in the radio frequency amplifier. In view of the relatively low transmission duty cycle, fairly good output can be obtained from the radio frequency amplifier without any problems with overheating of the tube.

Mixer diode 105 mixes the signals received on antenna 27 from transmitters in other vehicles, with the local oscillator signal received from local oscillator 28 through RF amplifier 26. Output signals at the intermediate frequency which are produced by the mixing of these two signals, are fed through resistor 110 to transformer 111 of intermediate frequency amplifier stage 90. The use of a diode for the mixer stage, assures an output from the mixer that is essentially independent of the amplitude of the output of local oscillator 28.

The intermediate frequency signals developed in the mixer are in turn amplified in the intermediate frequency amplifiers comprising transistors 90, 114 and 115 and then fed through capacitor 117 to diode detectors 101 and 102. In view of the relatively long pulse width of the transmitter pulses, the intermediate frequency amplifiers need not have wide band characteristics to provide the necessary output signals. As already noted, intermediate frequency amplifier 90 and detectors 101 and 102 are gated off when the transmitter is emitting by virtue of the negative going gating signal on line 71 fed through diodes 75 and 77. The output of diode detectors 101 and 102 is appropriately filtered by capacitor 120 and fed to the base of transistor 124 in filter unit 32. These output signals represent the envelope of the received signals and in the case of signals received from transmitters of system units have the predetermined pulse width and shape set by the pulse shaper.

Filter unit 32 operates to reject large amplitude relatively narrow pulses which generally represent noise radiated by ignition systems and the like and also to eliminate transmitter pulses received which are below a predetermined amplitude, thus, effectively determining the maximum operation range of the system. Filter unit 32 operates in the following manner: In the absence of a signal of a predetermined minimum amplitude at the base of transistor 124 from detectors 101 and 102, transistor 124 is held in the cutoff state by virtue of the back biasing voltage aplied to its emitter. The minimum response level of transistor 124 and thus the effective maximum operating range of the system, is set by means of potentiometer 130. Transistor 124 thus constitutes detector means which has an output only for signals above a predetermined amplitude. When a signal is received from detectors 101 and 102 of sufficient amplitude to cause transistor 124 to conduct, the transistor commences to conduct at the saturation level. When transistor 124 starts to conduct, transistor 132, which up to this time had been conducting, is driven to cutoff. When transistor 132 is driven to cutoff, capacitor 133 commences to charge. Transistor 137 is normally biased to cutoff. However, it commences to conduct when capacitor 133 charges to a predetermined level. The voltage level to which capacitor 133 charges is a function of the period of time that transistor 132 is cut off. This in turn is dependent upon the output of detectors 101 and 102. Whenever the output of the detectors falls below that required for causing transistor 124 to conduct, this transistor will return to the cutoff state and transistor 132 to its normally conducting state thereby discharging capacitor 133. Thus, capacitor 133 will charge to the level necessary to cause transistor 137 to conduct only when the output detectors 101 and 102 is continually high enough for a predetermined minimum time period such as to maintain transistor 124 conducting continually for at least this minimum time period.

The values of the components of filter unit 32 are chosen so that transistor 137 will be caused to conduct when pulses are received having a duration equal to those from transmitters of the system but so that it will not conduct with high amplitude but relatively short duration pulses which might result from ignition noise. Capacitor 133, its charge and discharge circuits and transistor 137 thus form pulse length discriminating means. Thus, noise signals are eliminated in filter unit 32 and only pulses of a predetermined minimum amplitude and width will cause the actuation of transistor 137. The output signals from transistor 137 are integrated by capacitor 150 in hold and amplifier circuits 33. The D.C. signal integrated by capacitor 150 is fed to cascaded direct coupled transistor amplifier stages 160, 161 and 162. The values of capacitor 150 and resistor 151 which provides a discharge path for this capacitor are chosen so that with signals being received continually from a transmitter of the system of high enough amplitude to cause transistor 137 to be driven to conduction that transistor 160 will be maintained in a saturated condition.

The output of transistor 160 is fed to indicator lamp 165 to ignite this lamp, thus providing the warning signal. The output of transistor 160 may also be utilized to produce a different type of warning signal which may be visual, aural or a combination of both.

Thus the device of the invention provides a simple yet highly effective means for producing a signal indicating a predetermined proximity between vehicles thus warning the operators of such proximity and lessening the hazard of a collision between such vehicles.

While the invention has been described and illustrated in detail, it is to be clearly understood that this is intended by way of illustration and example only and is not to be taken by way of limitation, the spirit and scope of this invention being limited only by the terms of the following claims.

I claim:

1. In a proximity indicating system for producing a warning signal on each one of a plurality of vehicles when said vehicles come within radio signal range of each other, a plurality of vehicles and a proximity unit on each one of said vehicles, each of said units comprising
    means for generating uniform long duration pulses of radio frequency energy at a predetermined frequency and at a random pulse rate,
    antenna means for radiating said radio frequency energy,
    receiving means for producing output signal pulses in response to the pulses transmitted by the units of others of said vehicles, said receiving means being connected to said antenna means,
    control means coupled to said radio frequency generating means, said control means disabling said receiving means during the occurrence of a pulse from said radio frequency generating means, and
    means responsive to the output of said receiving means for generating a warning signal when signals are received by said receiving means from units on other vehicles, said warning signal generating means including detector means responsive to the output of said receiving means, said detector means having an output for signals above a predetermined amplitude and pulse length discriminating means connected to the output of said detector means, said pulse length discriminating means responding only to pulses having a predetermined (long) duration.

2. The system as recited in claim 1, said receiver means including a receiver oscillator for determining the reception frequency thereof and additionally including single radio frequency amplifier means interposed between said means for generating radio frequency energy and said antenna means and said receiver oscillator and said antenna means for amplifying the respective outputs thereof.

3. The system as recited in claim 1 wherein said means for generating said pulses of radio frequency energy comprises a random pulse generator, pulse shaper means responsive to the output of said pulse generator for generating relatively long pulses of uniform width and amplitude, and transmitter signal generator means for generating radio frequency energy in response to the output of said pulse shaper means.

4. The system as recited in claim 3 wherein said control means for disabling said receiving means comprises a diode gating circuit interposed between said receiving means and said pulse shaper means for providing a disabling bias voltage to said receiving means in response to the output of said pulse shaper means.

5. In a proximity indicating system for producing a warning signal on each one of a plurality of vehicles when said vehicles come within radio signal range of each other, a plurality of vehicles and a proximity unit on each one of said vehicles, each of said units comprising means for generating uniform pulses of radio frequency energy at a predetermined frequency and at a random pulse rate,
  antenna means for radiating said radio frequency energy,
  receiving means for detecting signals transmitted by units on said vehicles, said receiving means being connected to said antenna means,
  control means coupled to said radio frequency generating means, said control means disabling said receiving means during the occurence of a pulse from said radio frequency generating means,
  detector means responsively connected to the output of said receiving means, said detector means having an output for signals above a predetermined amplitude,
  pulse length discriminating means connected to receive the output of said detector means, said pulse length discriminating means responding only to pulses having a predetermined (long) duration,
  means for integrating the output of said pulse length discriminating means, and
  means responsive to the output of said integrating means for generating a warning signal when signals above said predetermined amplitude and said predetermined duration are received by said receiving means.

6. The system as recited in claim 5 wherein said pulse length discriminating means includes a capacitor, power means connected to charge said capacitor, first electronic switch means connected across said capacitor for providing a discharge path therefor when in its closed condition, said first electronic switch means being connected to receive the output of said detector means and adapted to be actuated to the open condition when the output of said detector means is at least of said predetermined amplitude, and second electronic switch means responsive to the voltage across said capacitor for providing a signal to said integrating means when the output of said detector means includes pulses of at least said predetermined width.

7. In a proximity indicating system for producing a warning signal on each one of a plurality of vehicles when said vehicles come within radio signal range of each other, a plurality of vehicles and a proximity unit installed on each of said vehicles, each of said units including a pulse generator for generating random pulses,
  pulse shaper means responsive to the output of said pulse generator for generating relatively wide pulses of uniform width and amplitude and at the rate of said random pulses,
  transmitter signal generator means responsive to the output of said pulse shaper means for generating pulses of radio frequency energy, said pulses being in accordance with said pulse shaper means output,
  an antenna,
  means for coupling said pulsed radio frequency signals to said antenna,
  receiver means connected to said antenna for detecting signals at the frequency of said radio frequency signals,
  gating control means responsive to the output of said pulse shaper means for disabling said receiver means when said transmitter signal generator means is transmitting,
  charging means coupled to the output of said receiving means,
  capacitor means,
  said charging means effective to charge said capacitor means in response to pulses above a predetermined amplitude,
  indicator means, and
  means actuating said indicator means at a predetermined charge level on said capacitor means.

8. The system as recited in claim 7 wherein said pulse generator includes a plurality of neon bulbs, a power source connected between the anodes and cathodes of said neon bulbs, a resistor interposed between said power source and the anode of each of said bulbs, an output line and a separate capacitor connecting the anode of each of said neon bulbs to said output line.

9. The system as recited in claim 7 wherein said means for coupling said pulsed radio frequency signals to said antenna comprises a radio frequency amplifier, said receiver means including oscillator means for determining the reception frequency thereof, the output of said oscillator means being amplified and coupled to said antenna by said radio frequency amplifier.

10. In a proximity indicating system for producing a warning signal on each one of a plurality of vehicles when said vehicles come within radio signal range of each other, a plurality of vehicles and a proximity unit installed on each of said vehicles, each of said units including a pulse generator for generating random pulses,
  pulse shaper means responsive to the output of said pulse generator for generating pulses of uniform width and amplitude and at the rate of said random pulses,
  transmitter signal generator means connected to the output of said pulse shaper means for generating pulses of radio frequency energy in accordance with said pulse shaper means output,
  receiver oscillator means for generating a receiver mixer signal,
  an antenna,
  radio frequency amplifier means interposed between said transmitter signal generator means and said antenna and said receiver oscillator means and said antenna for amplifying the outputs thereof,
  receiver circuit means connected to said antenna for detecting signals at the frequency of said radio frequency energy,
  charging means coupled to the output of said receiver circuit means,
  capacitor means,
  said charging means effective to charge said capacitor means in response to pulses above a predetermined amplitude,
  indicator means, and
  means actuating said indicator means at a predetermined charge level on said capacitor means.

11. The system as recited in claim 10 wherein said pulse generator comprises a plurality of electronic switching devices having an anode and a cathode, an output line, a separate capacitor connecting the anode of each of said switching devices to said output line, a power source, and a separate resistor interposed between one terminal of said power source and the anode of each of said switching devices, the other terminal of said power source being connected to the cathodes of said switching devices, the time constants of the resistor and capacitor associated with each of said switching devices being different.

12. A plurality of vehicles and a proximity indicating system for producing a warning signal on each one of said vehicles when said vehicles come within radio signal range of each other including a proximity unit installed on each of said vehicles, each of said units including random pulse generator means for generating random pulses, pulse shaper means responsive to the output of said random pulse generator means for producing pulses of uniform width and height and at the random rate of said random pulses, transmitter signal generator means for generating radio frequency energy at a predetermined frequency, said signal generator means being keyed by the output of said pulse shaper means to produce random output pulses of said energy, receiver oscillator means for generating radio frequency signals at a frequency separated from said predetermined frequency by an intermediate frequency, radio frequency amplifier means for amplifying the outputs of said transmitter signal generator means and said receiver oscillator means, antenna means connected to receive the output of said radio frequency amplifier means, receiver circuit means connected to said antenna for mixing signals received from units installed on others of said vehicles with the output of said receiver oscillator means to produce an intermediate frequency signal and detecting the envelope of said intermediate frequency signal, means for disabling said receiver circuit means when said transmitter signal generator means is keyed by said pulse shaper means, said disabling means operating in response to the output of said pulse shaper means, charging means coupled to the output of said receiver circuit means, capacitor means, said charging means effective to charge said capacitor means in response to pulses above a predetermined amplitude, indicator means, and means actuating said indicator means at a predetermined charge level on said capacitor means.

References Cited by the Examiner

UNITED STATES PATENTS

| 1,612,427 | 12/1926 | Flurscheim | 340—33 |
| 2,140,840 | 12/1938 | Langer | 331—130 |
| 3,052,882 | 9/1962 | Pidhayny | 340—33 |

FOREIGN PATENTS

| 134,942 | 10/1933 | Austria. |

NEIL C. READ, *Primary Examiner.*

THOMAS B. HABECKER, *Examiner.*